May 30, 1961  J. S. BERNARD  2,986,134
COMBINATION FUEL PUMP AND FUEL INJECTOR APPARATUS
Filed Jan. 20, 1959
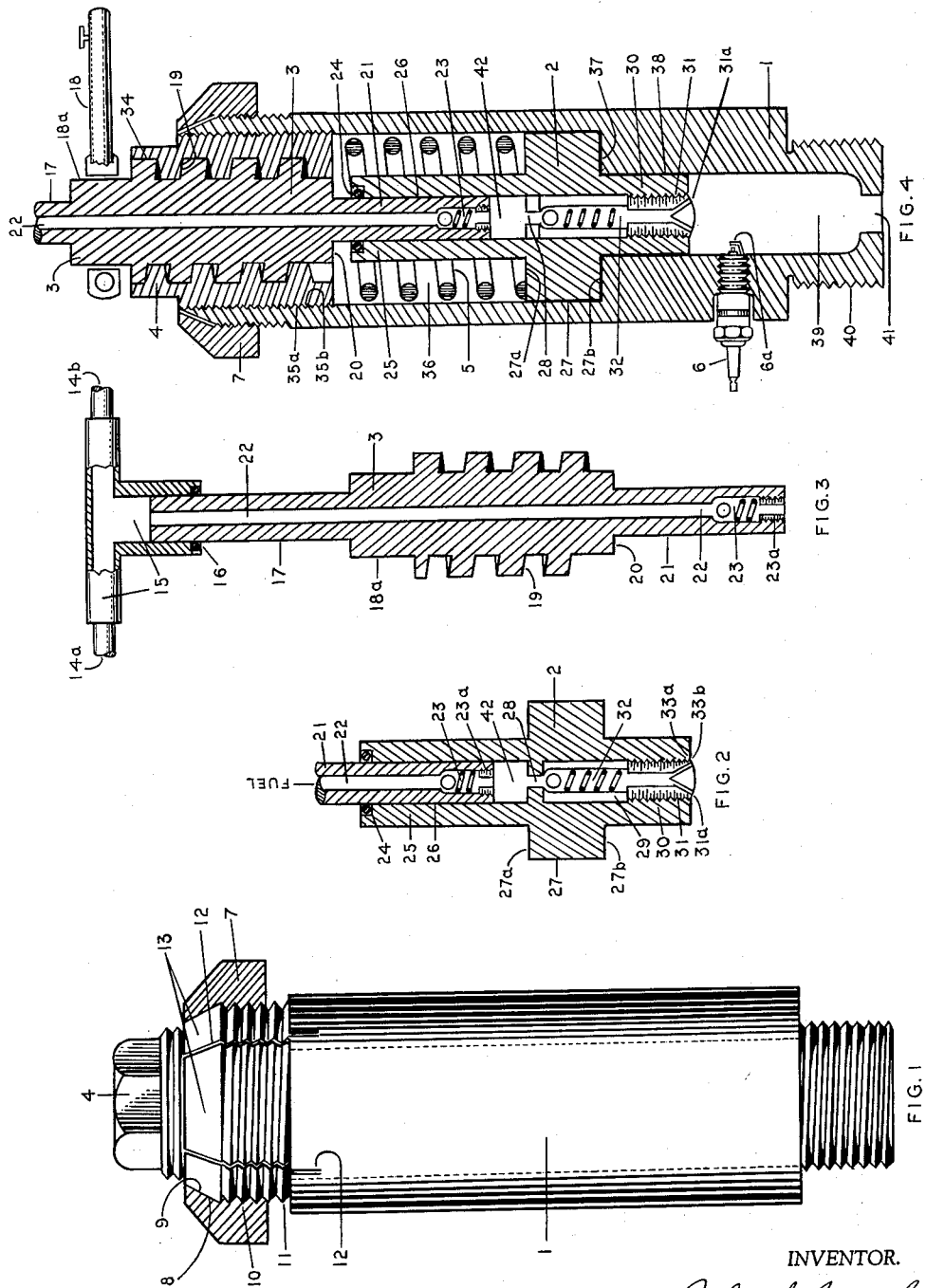
INVENTOR.
John S. Bernard United States Patent Office 2,986,134
Patented May 30, 1961

2,986,134

COMBINATION FUEL PUMP AND FUEL INJECTOR APPARATUS

John Springer Bernard, 2060 E. 4800 South St., Salt Lake City, Utah

Filed Jan. 20, 1959, Ser. No. 787,919

2 Claims. (Cl. 123—139)

This invention relates to internal combustion engines. Its principal objective is to provide an improved and useful apparatus with which to pump liquid fuels from a fuel tank, and to inject metered amounts of the liquid fuels into a compression space of an internal combustion engine, there being one such apparatus for each engine cylinder.

A fuel pump-injector apparatus of the compression operated type utilizes the compression pressure generated within an engine cylinder to actuate its pumping and injecting strokes. The timing of the injection stroke is governed by tension applied to a spring, contained within the apparatus, which exerts a force opposite from the compression pressure. The maximum compression pressure generated within the engine cylinder will decrease during the lifetime of the engine as the wear of the reciprocating engine parts progresses and, as the timing of the injection stroke is of primary importance to the operation of the engine, constant adjustments must be made to the tension applied to the aforementioned spring.

A further objective of this invention is to compensate for the loss of engine compression pressure by providing an ignition device as a component part of the pump-injector apparatus so that ignition of the injected fuel charge can be accomplished with a spark which is timed with the engine crankshaft. The injection cycle can occur at any point during the compression stroke of the engine due to this timed spark ignition, and thus increase the period of time that is generally allowed for an injection of fuel, thereby reducing the necessity of continued adjustments to the apparatus timing.

Raw liquid fuels are generally injected into a precombustion chamber contained within the engine cylinder head, into an ante chamber contained in the engine piston, or directly into the engine compression space by a fuel pump-injector apparatus. In all these instances, the compression gasses within the engine cylinder and the injector nozzle are relied upon to atomize and vaporize the fuel charge. A further objective of this invention is to inject the raw liquid fuels in a partially atomized state and to spray the fuel charge against the heated sidewalls of a chamber contained within the apparatus in order to break the fuel charge down into a vapor prior to its ignition; and, further, to ignite the fuel charge within the chamber so that the factors of heat, expansion, pressure, compression, force, and turbulence, as well as the injection nozzle and compression gasses, may be applied to further atomize and vaporize the fuel charge.

The means and the methods of attaining the above objectives will be more fully understood by referring to the accompanying drawings wherein Figure 1 illustrates the timing adjustment locking arrangement, Figure 2 illustrates the means and the method of passing liquid fuels into and through the apparatus metering space, Figure 3 illustrates the means and the manner of passing liquid fuels from a fuel source through the control member, and Figure 4 illustrates an assembly embodying all the features of this invention.

Referring to Figure 1, the apparatus outer casing or housing 1, containing the apparatus adjustment plug 4, is depicted in a vertical elevation to illustrate the means of securing the timing adjustment of the apparatus. A conical taper 9, converging toward and terminating at the top of the housing 1, is machined on the outer housing surface and threads 11, which being immediately below the conical taper 9, course downward for a sufficient distance to permit the mounting of an adjustment lock nut 7. The upper extremity of the housing 1, having been bored to permit the mounting of the threaded adjustment plug 4, is divided by slots 12 into equal segments 13. The adjustment lock nut 7 is adapted to be mounted onto the machined extremity of the housing by interior threads 10 which correspond to the housing threads 11. This adjustment lock nut 7 also contains an interior conical taper 8 which corresponds to the housing conical taper 9. Mounting the adjustment lock nut 7 in a manner to make contact between the tapers 8 and 9, and by further downward movement, applying pressure from the lock nut taper 8 onto the housing taper 9 will cause the housing segments 13 to converge toward one another in the spaces provided by the slots 12. Decreasing the diameter of the machined extremity of the housing 1 in this manner causes pressure to be applied to the adjustment plug 4 and prevents its vertical or rotary movement. The position of the adjustment plug 4 may be changed (whenever it becomes necessary to compensate for the loss of engine compression due to the wearing of the engine reciprocating parts) by loosening the adjustment lock nut 7 and allowing the segments 13 to resume their normal vertical positions.

Referring to Figure 2, the apparatus reciprocating piston assembly 2, containing the apparatus control member plunger 21, is depicted in a vertical cross sectional view to illustrate the method of passing liquid fuels into and through the apparatus metering space 42. The round, outside diameter of the piston 2 is machined to provide a flange 27, forming right angle offsets 27a and 27b between an upper piston extremity 25 and a lower piston extremity 30. A center bore 26 extending downward into the extremity 25 and a center bore 29 extending upward into the extremity 30 are connected by a smaller diameter center bore 28 to form a longitudinal center fuel passageway through the piston 2. An injection nozzle 31, adapted to be mounted in the bore 29 by cooperating threads 33a and 33b, holds tension upon a suitable check valve 32 which seats against the connecting bore 28. A bored plug 23a holds tension upon a suitable check valve 23 which seats against a fuel duct 22 contained in the plunger 21. The plunger 21 is extended through an O ring packing gland 24 and into the intake extremity of the fuel passageway formed by the bore 26. The check valve 32 prevents air from entering the passageway from the discharge extremity (bore 29) and the close sliding fit between the plunger 21 and the sidewalls of the bore 26, together with the O ring packing gland 24, prevents air from entering the passageway from the intake extremity (bore 26); therefore, movement of either the piston 2 or the plunger 21, which increases the linear distance of the metering space 42, will create a vacuum or suction within the passageway causing fuels to flow through the duct 22, around the check valve 23, and into the metering space 42. Movement of either the piston 2 or the plunger 21, which decreases the linear distance of the metering space 42, will seat the check valve 23 against the duct 22 and apply force to the fuels entrapped in the space 42 causing such fuels to flow around the check valve 32 and through the nozzle 31.

Referring to Figure 3, the apparatus control member 3 and a suitable fuel line T connection 15 are depicted in a vertical cross sectional view to illustrate the manner of passing liquid fuels from a fuel source through the control member 3. The inside diameter of the control member 3 comprises a fuel duct 22. A bored plug 23a, holding tension upon a suitable check valve 23 which seats against the outlet of the duct 22 in the control extremity 21, comprises a suitable means for controlling the directional flow of the fuels. An extremity 17, formed above a raised exterior part containing threads 19 and space 18a for mounting a means for effecting rotative movement of the control member 3, is adapted to be extended through a suitable O ring packing gland 16 and to be slidably housed within the suitable T connection 15 contained on a fuel line 14ab. The close sliding fit of the extremity 17 within the T connection 15 and the O ring packing gland 16 prevent the leakage of fuels and allow the control member 3 to be rotated and extended vertically within the T connection 15. The fuel line extremity 14a may be extended and may be suitably connected to a tank or receptacle (not illustrated) for containing liquid fuels; the fuel line extremity 14b may extend on to a like T connection or may be plugged and terminated. When the fuel line extremity 14a is suitably connected to a fuel source and the fuel line extremity 14b is plugged and terminated, a suction or vacuum applied to the control member extremity 21 will urge fuels to flow from the fuel source, through the fuel line extremity 14a, into the T connection 15, through the fuel duct 22, and around the check valve 23.

Referring to Figure 4, an apparatus, embodying all of the features of this invention, is depicted in a vertical cross sectional view to illustrate its assembly and to describe its operations. The apparatus outer casing or housing 1 may be mounted to a cylinder head or compression space of an internal combustion engine by means of the illustrated threads 40 which could cooperate with the threads used to mount the spark or ignition device presently provided in the cylinder head or compression space of a conventional engine, or in any manner which would provide a suitable mounting whereby the orifice 41 would communicate with the compression space of the internal combustion engine.

The inside diameter of the housing 1 is formed with an upper chamber 36 having a diameter corresponding to the outer diameter of the piston flange 27, and with a lower chamber 38 having a diameter corresponding to the piston extremity 30 to provide for the slidable mounting of the reciprocating piston assembly 2 hereinabove described and illustrated in Figure 2. A right angle offset 37 formed at the point of convergence of the aforementioned chambers provides a point of rest for the right angle offset 27b on the bottom of the piston flange 27, which limits the inward travel of the reciprocating piston assembly 2, and provides a vaporizing space 39 between the communicating orifice 41 and the injection nozzle 31. A suitable ignition device 6 is threadably mounted to the housing 1 in a manner to extend its spark or heated end 6a into the vaporizing space 39 immediately below the lowermost position of the piston extremity 30.

A suitable compression spring 5 is inserted in the upper housing chamber 36 in a manner to rest upon the right angle offset 27a on the top of the piston flange 27. The adjustment plug 4, mounted within the upper housing chamber 36 by means of cooperating threads 35a and 35b, is utilized to increase or decrease tension upon the compression spring 5, thus regulating the timing of the outward movement of the reciprocating piston assembly 2. The locking arrangement, hereinabove described and illustrated in Figure 1, provides means of securing the desired timing adjustment during operations of the apparatus.

The adjustment plug 4 is provided with a central threaded bore 34 which is in alignment with the piston bore 26. The control member 3, hereinabove described and illustrated in Figure 3, is mounted within the apparatus by engaging the control threads 19 in the abovementioned threaded bore 34 and extending the control member plunger extremity 21 through the piston packing gland 24 and into the piston bore 26. An exterior right angle offset 20 is machined between the control member threads 19 and the control member plunger extremity 21 for the purpose of regulating and limiting the outward travel of the reciprocating piston assembly 2. The length of the control member plunger extremity 21 is such that when contact is made between the control offset 20 and the piston extremity 25 there is sufficient clearance between the lowermost extension of the control member plunger 21 and the bottom of the bore 26 to prevent damage from occurring to the bottom of the control member plunger 21. A suitable control arm 18 is mounted on the space 18a to provide for rotative movement of the control member 3, and the control member extremity 17 extends outward to be connected to a fuel line 14ab as illustrated in Figure 3.

Control of the amounts of fuel to be pumped and/or injected during a given stroke of the apparatus is obtained by regulating the distance of outward travel of the reciprocating piston assembly 2. This regulation is provided by movement of the control arm 18 which induces rotative movement of the control member threads 19 within the threaded bore 34 of the adjustment plug 4 causing vertical movement of the control member 3. Vertical movement of the control member 3 increases or decreases equidistantly the linear distance of the metering space 42 and the distance between the piston extremity 25 and the control member offset 20.

The apparatus is actuated by the pressurized gases which enter through the communicating orifice 41 during the compression stroke of the internal combustion engine. The reciprocating piston assembly 2 is forced outward by the pressurized gasses until contact is made between the piston extremity 25 and the control member offset 20. Tension applied to the compression spring 5 by the adjustment plug 4 forces the reciprocating piston assembly 2 inward to its normal position of rest during the engine's exhaust and intake strokes.

The pumping and injecting cycles of the apparatus are accomplished during the inward and outward movement of the reciprocating piston assembly 2. The control member 3, after its vertical adjustment, is held in a fixed position with respect to the reciprocating piston assembly 2 by the engagement of the control member threads 19 in the threaded bore 34 of the adjustment plug 4. The check valve 32 seated against the connecting bore 28, the close sliding fit of the control plunger 21 within the piston bore 26, and the packing gland 24 create a vacuum or suction within the metering space 42 during the inward movement of the reciprocating piston member 2, causing the fuels of flow from the fuel source, through the duct 22, around the check valve 23, and into the metering space 42. The check valve 23, seated against the duct 22, the close sliding fit of the plunger 21 within the bore 26, and the packing gland 24 entrap the fuels contained within the metering space 42 during the outward movement of the reciprocating piston assembly 2 and the force applied by the outward movement causes the fuels to flow around the check valve 32 and through the injection nozzle 31.

The initial timing of the apparatus injection cycle for a conventional internal combustion engine may be set, by the tension applied to the compression spring 5, to complete the injection of the fuel charge at approximately 45 degrees before the top dead center of the engine piston on the engine's compression stroke. The timing of the apparatus will not need changing until the engine's compression losses are such that the injection cycle will not have been completed by the time the engine piston reaches the position of top dead center.

The injection nozzle 31 is provided with orifices 31a that serve as a means of partially atomizing the injected liquid fuels and directing the fine, partially atomized spray against the side walls of the vaporizing space 39.

Partially atomizing the fuel with the nozzle orifices 31a and spraying the fuel against the side walls of the vaporizing space 39 atomize the fuels sufficiently to permit ignition of the fuel charge while the engine is cold.

After the starting of the internal combustion engine and during its operation, the side walls of the vaporizing space 39 are heated by the combustion of the successive fuel charges. The spraying of the partially atomized liquid fuels against these heated surfaces breaks it down into a vapor. The fuels, striking the heated surfaces, tend to control the heat within the vaporizing space 39, but the apparatus should be provided with a suitable heat dissipating device, such as outer surface cooling fins or a water jacket (not illustrated), to prevent pre-ignition of the fuel charge.

To avoid confusion with the conventional pre-combustion or ante-chambers which are presently used in conjunction with existing fuel injector apparatus, I have elected to call the chamber in my invention a "vaporizing space." It will be noted, as the comparison is made to differentiate this "vaporizing space" from the conventional chambers, that the vaporizing space actually functions as a pre-ignition chamber. However, the term "pre-ignition," when used in the mechanical sense, denotes an adverse condition wherein the fuel charge is ignited prior to the engine's piston reaching its proper position within the engine's cylinder, therefore, it is deemed advisable to select another term for the purpose of definition. The term "vaporizing space," which will be used to claim this invention, should be interpreted as defining a specifically designed chamber having the capability of retaining or temporarily detaining the entire injected fuel charge within its confines during the complete fuel injection stroke of the injector apparatus and until the ignition of the fuel has been caused to occur.

The conventional pre-combustion chambers may be classified into two types. The first type having the function of igniting or firing the injected fuel charge as it is passed through the chamber and which does not necessarily have to conform to any particular design feautres and the second type having the combined functions of igniting and preparing the injected fuel charge prior to its complete combustion. This second type pre-combustion chamber must conform to a specific design which causes the ignited fuel charge to be swirled and circulated within the confines of the chamber so as to thoroughly mix the unburned fuel particles with the compression gases prior to the entry of the charge into the compression space of the engine. An ante-chamber is designed to perform the same function as the second type pre-combustion chamber but it is formed into and as a part of the engine's piston rather than being formed into the engine's cylinder head or as a part of the fuel injector apparatus.

The central idea of the vaporizing space 39 is based upon an entirely different principle. The conventional pre-combustion and/or ante-chambers function to ignite the injected fuel charge with the commencing of the fuel injection stroke and to mix and prepare the charge while it is in the burning state. The vaporizing space 39 is designed to retain or temporarily detain the entire amount of the injected fuel charge within its confines during the complete fuel injection cycle of the fuel injector apparatus. After the completion of the injection and at the precise moment when the engine's piston is in proper relation with respect to its position of "top dead center" the fuel charge is then to be ignited. The force created by the ignition is utilized to thrust the fuel-air mass from the vaporizing space 39 and into the compression space of the engine. The design of the chamber 38 is such, that, when the initial force is created, other forces are set in motion which lead to the atomization of the unvaporized and unburned fuel particles as they are passed into and through the orifice 41 which communicates the vaporizing space 39 with the compression space of the engine.

Liquid fuel which is in the process of being injected, or which has been injected or deflected through the vaporizing space 39 prior to the ignition of the charge, cannot be acted upon by the created forces. The apparatus must have been set to complete the fuel injection cycle prior to the time when the engine's piston reaches the position known as "top dead center." The vaporizing space 39, provided within the apparatus chamber 38, may conform to several configuration and retain or temporarily detain the injected fuel particles until the ignition is caused to occur. However, the most difficult chamber in which to retain or temporarily detain an injected fuel charge is one wherein the apparatus and the discharge orifice of the chamber are aligned and the apparatus is required to be placed in an upright position when installed onto the internal combustion engine. I have illustrated such an arrangement in Figure 4. This illustration clearly shows the interior sidewalls of the chamber 38 converging toward the venturi type communicating orifice 41 in an arc; a linear distance between the injector nozzle 31 and the interior opening of the communicating orifice 41; an elongated shaped vaporizing space 39; and the force vector from the nozzle orifices 31a directed at an angle which is outward and away from the communicating orifice 41. These design features are combined to detain the injected fuel charge within the confines of the vaporizing space 39 during the time lapse from the beginning, through to the completion, of the injection cycle and until the ignition is caused to occur. The reasons for these design features and the methods of computation which apply to their limits are hereby explained.

Directing the force vector from the nozzle orifices 31a outward and away from the communicating orifice assures that none of the injected fuel will be forcibly injected from the vaporizing space 39 during the injection cycle of the apparatus. The angle of the force vector from the nozzle orifices 31a causes the majority of the injected fuel to strike the sidewalls of the chamber 38. This portion of the injected charge tends to course down the chamber's sidewalls and around the curved surfaces of the arc. The fuel particles which traverse the distance from their point of contact with the chamber's sidewalls and course around the curved surfaces are acted upon by centrifugal forces which cause them to deflect across, rather than into the opening of the venturi type communicating orifice 41.

A portion of the fuel will not be injected with sufficient force to cause it to strike the sidewalls of the chamber 38, and a portion of the fuel which does strike the sidewalls will splash upon contact. These fuel particles, together with that portion of the charge which courses down the sidewalls, are detained within the vaporizing space 39 by extending the linear distance between the injector nozzle 31 and the interior opening of the communicating orifice 41. The linear distance required should be computed for each type or model of engine upon which the apparatus is to be applied. The formula to be applied (speed×time=distance) in determining the correct linear distance should be based upon the speed of the fuel from the nozzle orifices 31a multiplied by the time lapse occurring while the engine's piston traverses the distance from that degree of crankshaft turn at which the apparatus fuel injection cycle begins until the engine's piston position of "top dead center" has been reached.

The venturi principle (which proves that, when a fluid flows through two pipes of different sizes, the volume passing through the smaller pipe will be equal to the volume passing through the larger pipe) establishes that the velocity of the gases flowing through the venturi type communicating orifice 41 will be greater than the velocity of the gases within either the engine's cylinder or within the vaporizing space 39. This principle can be considered to a minor degree in computing the required linear distance between the injector nozzle 31 and the interior opening of the communicating orifice 41. However, the "pipes of different sizes" in this case are enclosed at each extremity which causes pressure to build up within the vaporizing space 39. This pressure tends to reduce the velocity of the gases flowing through the venturi type orifice 41 near the end of the engine's compression stroke. The reduced velocity near the end of the engine's compression stroke will not be sufficient to return fuel particles into the vaporizing space 39 if such fuel particles have been injected, deflected or allowed to drop into or through the venturi type orifice 41. The velocity can be expected to be great enough to prevent fuel particles from entering the orifice 41 by causing such particles to hang on the edges of the relatively flat surfaces of the arc and to give a measure of buoyancy to those fuel particles which are deflected across the opening.

The vaporizing space 39 is illustrated as having an elongated shape. This is to emphasize the necessity for decreasing the diameter of the chamber 38 in proportion to any increase in the linear distance between the communicating orifice 41 and the injector nozzle 31. It is necessary to decrease the diameter in order to control the volume of the vaporizing space 39. The majority of the injected fuel charge must burn and expand within the engine's cylinder if the internal combustion engine is to be operated at optimum efficiency. This requires that the volume of the vaporizing space 39 be limited so as not to provide sufficient air to allow the majority of the fuel charge to be vaporized and consumed while within the confines of the space 39. A volume which provides sufficient air to vaporize about 25 percent of the fuel required to operate the engine at the idling speed is the recommended maximum which should be allowed.

The computation to determine the volume limits of the vaporizing space is to be based upon the heat which will be present within the chamber after the ignition has occurred. The required amount of air to vaporize the recommended percentage of fuel can be determined from established charts which show the vapor capacity, or saturation point, of air in the presence of various degrees of heat. The heat generated by ignited fuel can likewise be determined. When the type of liquid fuel to be used and the heat dissipating quality of the vaporizing space 39 has been established, the factors can be combined to determine the proper volume of the vaporizing space 39. Computing the volume of the vaporizing space 39 for the amount of fuel used while the engine is operating at the idling speed provides for a decrease in the percentage of fuel allowed to be vaporized and consumed within the vaporizing space 39 when the speed of the engine is increased by the injecting of larger amounts of fuel with each apparatus stroke.

The apparatus reciprocating piston 2 is designed and arranged within the chamber 38 in a manner so as to slightly increase and decrease the volume of the vaporizing space 39 as the amount of fuel injected (and the engine's speed) is increased and decreased. This feature is to provide for a slightly increased amount of vapor with which to produce a force of greater magnitude through the ignition while the engine is operating above the idling speed range. The increased force is needed to eject the fuel-air mass from the vaporizing space 39 more rapidly and thus compensate for the decreased time lapse between engine revolutions during the engine's higher speed ranges.

Immediately prior to the ignition of the fuel charge, conditions within the illustrated vaporizing space 39 will exist whereby the injection cycle of the apparatus will have been completed, some of the liquid molecules will be transferring from the liquid to the vapor state, the unvaporized fuel particles will be falling or coursing toward the communicating orifice 41. The vaporized fuel will be concentrated in the uppermost part of the space so as to surround the spark gap 6a of the ignition device 6, the pressurized gases which are caused to enter the space by the compression stroke of the engine will be mixing and preventing the unvaporized fuel particles from escaping the confines of the space, and an insufficient amount of air will be present to permit the complete combustion of the charge.

An electric spark (timed with the engine's crankshaft) across the spark gap 6a of the ignition device 6 will be utilized to ignite the fuel charge. The force of the ignition will drive the unvaporized fuel particles toward the compression space of the engine. The majority of these unvaporized fuel particles will be driven around the curved surfaces of the arc and forced to enter the ejecting air stream at a horizontally opposed angle. The entering of the unvaporized fuel particles in opposition to the air stream will cause them to be acted upon by viscous friction and will create turbulence, in the form of swirls and eddies, which will extend across the entire opening of the communicating orifice 41. That portion of the unvaporized fuel particles which is not completely atomized by these forces will be speeded through the venturi type communicating orifice 41 and be battered into the pressurized gases held within the engine's compression space and be further atomized. In this way, the entire injected fuel charge will be prepared for rapid burning. A sufficient amount of air will be present within the engine's compression space and will allow the continuous and reasonably complete combustion of the prepared charge during the engine's power stroke.

Chambers having other designs or configurations may be employed to accomplish the results as described herein above. The designer may elect, or may be forced to modify the chamber which is to be used as a vaporizing space in order to apply its principles to a particular model of an internal combustion engine. The shape of chamber to be so utilized is irrelevant so long as the configuration provides a suitable space which has the capability of retaining or temporarily detaining the injected fuel charge during the complete apparatus fuel injection cycle and until the ignition has been caused to occur, has the correct volume, and the discharge orifice causes the required friction and turbulence with which to atomize the unvaporized and unburned fuel particles.

The optimum efficiency of the illustrated and described apparatus can only be obtained when installed on an engine having a relatively low compression ratio. This is defined as an engine wherein the compression stroke does not create a compression heat which is high enough to ignite the injected fuel charge without benefit of an ignition device such as a spark or glow plug. The installation of this apparatus on engines having higher compression ratios nullifies the value of the vaporizing space 39.

The described apparatus may be employed on engines having a high compression ratio if the operator is willing to forego the benefits of the vaporizing and atomizing features. If such use is to be contemplated, the timing of the apparatus injection cycle must be set so as to begin the injection of fuel at from 1 to 5 degrees before the engine's piston reaches the position of top dead center. In these applications, the vaporizing space 39 will act as a conventional precombustion chamber (or ante-chamber) in which to prepare the injected fuel by mixing, with the compression gases, and partially vaporizing the injected fuel particles after the charge has been ignited. In these applications, it is recommended that the glow plug type ignition device be utilized in lieu of the illustrated spark ignition device 6 and that the glow plug be brought to the ignition heat prior to the starting of the engine.

It is to be understood that the exterior design of the outer casing or housing 1 may be modified, and that such modification will be necessary to adapt the apparatus to various designs of internal combustion engines. Further, the drawings are for the intended purpose of illustrating the means and methods employed to accomplish the desired functions of the invented apparatus and not necessarily to limit the construction of the various component parts. Such improvements as providing a wrench engaging outer housing surface, cooling fins to dissipate heat, incorporating the housing 1 within a cylinder head or compression space by casting it as a part of the cylinder head or engine block, providing oil passages for lubrication purposes, modifying the shape of the interior component parts, use of component parts other than those illustrated to accomplish the desired functions of the apparatus and similar modifications or changes do not materially affect the principles involved as illustrated and hereinabove described, and all rights are hereby reserved to make any and all such modifications and/or changes as may fairly fall within the limits of the following claims.

What I claim as new and desire to secure by Letters Patent are as follows:

1. Fuel injection apparatus for an internal combustion engine, comprising a combined ignition and supply device adapted to be detachably mounted in communication with the combustion chamber of a cylinder of an internal combustion engine; said device comprising a housing having at one end an elongated cylindrical chamber provided with sidewalls and endwalls; a substantially flat portion centrally located in one end wall and annular curved wall portions connecting said sidewalls with said centrally located flat portion; fuel injection means in said housing adapted to receive liquid fuel and inject the same into said elongated cylindrical chamber, said fuel injection means having spray nozzles and being mounted in said housing with said nozzles entering said elongated cylindrical chamber through the end opposite said centrally located flat portion, said nozzles being orientated to direct fuel injected therethrough against the sidewalls of said elongated chamber; fuel ignition means in said chamber; an orifice substantially in the center of said centrally located flat portion and having its longitudinal axis substantially parallel to the longitudinal axis of said elongated chamber; and means for detachably securing said housing to an internal combustion engine with said orifice providing communication between said elongated chamber and the combustion chamber of a cylinder of said engine.

2. Apparatus according to preceding claim 1 in which said fuel injection means is pressure actuated by pressure supplied through said orifice, and said ignition means is timed to ignite during the period of pressure supply through said orifice.

References Cited in the file of this patent

UNITED STATES PATENTS

| 1,349,515 | Lombard | Aug. 10, 1920 |
| 1,622,266 | Ake | Mar. 29, 1927 |
| 1,702,810 | Buhr | Feb. 19, 1929 |

FOREIGN PATENTS

| 47,930 | France | May 11, 1937 |
| (4th add. to 799,951) | | |